(12) United States Patent
Yadin et al.

(10) Patent No.: US 11,226,435 B2
(45) Date of Patent: Jan. 18, 2022

(54) CONTROL OF DYNAMIC LENSES

(71) Applicant: Optica Amuka (A.A.) Ltd., Petach Tikva (IL)

(72) Inventors: Yoav Yadin, Ganey Tikva (IL); Yariv Haddad, Raanana (IL); Alex Alon, Binyamina (IL)

(73) Assignee: OPTICA AMUKA (A.A.) LTD., Petach Tikva (IL)

( * ) Notice: Subject to any disclaimer, the term of this patent is extended or adjusted under 35 U.S.C. 154(b) by 183 days.

(21) Appl. No.: 16/566,910

(22) Filed: Sep. 11, 2019

(65) Prior Publication Data

US 2020/0003933 A1 Jan. 2, 2020

Related U.S. Application Data

(62) Division of application No. 15/310,798, filed as application No. PCT/IB2015/053335 on May 7, 2015, now Pat. No. 10,466,391.

(60) Provisional application No. 62/007,948, filed on Jun. 5, 2014, provisional application No. 62/010,475, filed on Jun. 11, 2014.

(51) Int. Cl.
| | |
|---|---|
| G02B 3/00 | (2006.01) |
| G02B 3/10 | (2006.01) |
| G02C 7/08 | (2006.01) |
| G02F 1/29 | (2006.01) |
| G02C 7/06 | (2006.01) |

(52) U.S. Cl.
CPC ............. G02B 3/0081 (2013.01); G02B 3/10 (2013.01); G02C 7/06 (2013.01); G02C 7/083 (2013.01); G02F 1/29 (2013.01); G02F 1/294 (2021.01)

(58) Field of Classification Search
CPC .......... G02B 3/0081; G02B 3/10; G02C 7/06; G02C 7/083; G02F 1/29; G02F 1/294
See application file for complete search history.

(56) References Cited

U.S. PATENT DOCUMENTS

| | | | |
|---|---|---|---|
| 5,073,021 A | * | 12/1991 | Marron ................... G02C 7/06 351/159.41 |
| 6,553,504 B1 | | 4/2003 | Katzenelson et al. |
| 8,922,902 B2 | | 12/2014 | Blum et al. |

(Continued)

FOREIGN PATENT DOCUMENTS

| | | |
|---|---|---|
| RU | 2541819 C2 | 2/2015 |
| WO | 03077012 A2 | 9/2003 |
| WO | 2017003330 A1 | 1/2017 |

OTHER PUBLICATIONS

European Application # 17785529.3 search report dated Oct. 4, 2019.

(Continued)

*Primary Examiner* — Joseph P Martinez
*Assistant Examiner* — Vipin Patel
(74) *Attorney, Agent, or Firm* — Kligler & Associates Patent Attorneys Ltd (57) ABSTRACT

Adaptive spectacles (20) include a spectacle frame (25) and first and second electrically-tunable lenses (22, 24), mounted in the spectacle frame. In one embodiment, control circuitry (26) is configured to receive an input indicative of a distance from an eye of a person wearing the spectacles to an object (34) viewed by the person, and to tune the first and second lenses in response to the input.

18 Claims, 5 Drawing Sheets

(56) References Cited

U.S. PATENT DOCUMENTS

| | | |
|---|---|---|
| 9,958,703 B2 | 5/2018 | Pugh et al. |
| 10,268,050 B2 | 4/2019 | To et al. |
| 2002/0044125 A1 | 4/2002 | Maltese |
| 2003/0231293 A1 | 12/2003 | Blum et al. |
| 2007/0052876 A1* | 3/2007 | Kaufman ............... G02C 7/083 349/13 |
| 2007/0280626 A1* | 12/2007 | Haddock ............... G01S 11/12 385/147 |
| 2007/0290972 A1 | 12/2007 | Meredith |
| 2009/0279050 A1* | 11/2009 | McGinn ............... G02C 7/101 351/159.47 |
| 2010/0149444 A1 | 6/2010 | Hikmet et al. |
| 2010/0157181 A1 | 6/2010 | Takahashi |
| 2011/0228181 A1 | 9/2011 | Jeong et al. |
| 2011/0234934 A1 | 9/2011 | Chang |
| 2011/0317128 A1 | 12/2011 | Guilloux et al. |
| 2012/0300171 A1 | 11/2012 | Gupta et al. |
| 2015/0378240 A1 | 12/2015 | Wang et al. |
| 2016/0161767 A1 | 6/2016 | Childers |
| 2017/0219828 A1 | 8/2017 | Tsai et al. |
| 2017/0269453 A1 | 9/2017 | Galstain et al. |
| 2017/0276963 A1 | 9/2017 | Brennan et al. |

OTHER PUBLICATIONS

International Application # PCT/IB2019/056243 search report dated Nov. 3, 2019.
EP Application # 18869416 Search Report dated Jun. 16, 2021.
CA Application # 2,947,809 Office Action dated Apr. 19, 2021.
CA Application # 2,939,664 Office Action dated Apr. 20, 2021.
U.S. Appl. No. 16/085,581 Office Action dated May 7, 2021.
International Application # PCT/IB2020/054524 Search Report dated Aug. 31, 2020.
U.S. Appl. No. 16/085,581 Office Action dated Nov. 3, 2020.
EP Application # 20199016.5 Search Report dated Nov. 30, 2020.
U.S. Appl. No. 16/085,581 Office Action dated Sep. 20, 2021.
EP Application # 21202537.3 Search Report dated Nov. 4, 2021.

* cited by examiner

CONTROL OF DYNAMIC LENSES

CROSS-REFERENCE TO RELATED APPLICATIONS

This application is a division of U.S. patent application Ser. No. 15/310,798, filed Nov. 14, 2016, in the national phase of PCT Patent Application PCT/IB2015/053335, filed May 7, 2015, which claims the benefit of U.S. Provisional Patent Application 62/007,948, filed Jun. 5, 2014, and of U.S. Provisional Patent Application 62/010,475, filed Jun. 11, 2014. Both of these provisional applications are incorporated herein by reference.

FIELD OF THE INVENTION

The present invention relates generally to optical devices, and particularly to electrically-tunable lenses.

BACKGROUND

Tunable lenses are optical elements whose optical characteristics, such as the focal length and/or the location of the optical axis, can be adjusted during use, typically under electronic control. Such lenses may be used in a wide variety of applications. For example, U.S. Pat. No. 7,475,985 describes the use of an electro-active lens for the purpose of vision correction.

Electrically-tunable lenses typically contain a thin layer of a suitable electro-optical material, i.e., a material whose local effective index of refraction changes as a function of the voltage applied across the material. An electrode or array of electrodes is used to apply the desired voltages in order to locally adjust the refractive index to the desired value. Liquid crystals are the electro-optical material that is most commonly used for this purpose (wherein the applied voltage rotates the molecules, which changes the axis of birefringence and thus changes the effective refractive index), but other materials, such as polymer gels, with similar electro-optical properties can alternatively be used for this purpose.

Some tunable lens designs use an electrode array to define a grid of pixels in the liquid crystal, similar to the sort of pixel grid used in liquid-crystal displays. The refractive indices of the individual pixels may be electrically controlled to give a desired phase modulation profile. (The term "phase modulation profile" is used in the present description and in the claims to mean the distribution of the local phase shifts that are applied to light passing through the layer as the result of the locally-variable effective refractive index over the area of the electro-optical layer of the tunable lens.) Lenses using grid arrays of this sort are described, for example, in the above-mentioned U.S. Pat. No. 7,475,985.

PCT International Publication WO 2014/049577, whose disclosure is incorporated herein by reference, describes an optical device comprising an electro-optical layer, having an effective local index of refraction at any given location within an active area of the electro-optical layer that is determined by a voltage waveform applied across the electro-optical layer at the location. An array of excitation electrodes, including parallel conductive stripes extending over the active area, is disposed over one or both sides of the electro-optical layer. Control circuitry applies respective control voltage waveforms to the excitation electrodes and is configured to concurrently modify the respective control voltage waveforms applied to excitation electrodes so as to generate a specified phase modulation profile in the electro-optical layer.

U.S. Patent Application Publication 2012/0133891 describes an electro-optical apparatus and method for correcting myopia that includes at least one adaptive lens, a power source, and an eye tracker. The eye tracker includes an image sensor and a processor operatively connected to the adaptive lens and the image sensor. The processor is configured to receive electrical signals from the image sensor and to control the correction power of the adaptive lens to correct myopia, with the correction power dependent on a user's gaze distance and myopia prescription strength.

SUMMARY

Embodiments of the present invention that are described hereinbelow provide improved electronically-tunable optical devices.

There is therefore provided, in accordance with an embodiment of the invention, an optical device, which includes an electro-optical layer, having an effective local index of refraction at any given location within an active area of the electro-optical layer that is determined by a voltage waveform applied across the electro-optical layer at the location. Conductive electrodes extend over opposing first and second sides of the electro-optical layer. The electrodes include an array of excitation electrodes, which include parallel conductive stripes extending along respective, mutually-parallel axes across the first side of the electro-optical layer. Each stripe is divided into two or more segments extending over respective, mutually disjoint parts of an axis of the stripe. Control circuitry is coupled to apply respective control voltage waveforms to the segments of the excitation electrodes so as to generate a specified phase modulation profile in the electro-optical layer and is configured to concurrently modify the respective control voltage waveforms applied to one or more of the segments of each of a plurality of the excitation electrodes, thereby modifying a phase modulation profile of the electro-optical layer.

Typically, the control circuitry is configured to apply the control voltage waveforms to the excitation electrodes so that the device functions as a lens, having focal properties determined by the phase modulation profile. In some embodiments, the control circuitry is configured to apply different, respective control voltage waveforms to different segments of at least some of the excitation electrodes, so that the lens functions as a multifocal lens. In a disclosed embodiment, the two or more segments of each stripe include at least respective first and second segments, such that the first segments of the stripes together extend across a first area of the electro-optical layer, while the second segments of the stripes together extend across a second area of the electro-optical layer. The control circuitry is configured to apply the different, respective control voltage waveforms so that the first area has a first focal length and the second area has a second focal length, different from the first focal length.

In other embodiments, the device includes, for each stripe, one or more switches interconnecting the segments of the stripe and operable by the control circuitry to electrically join or separate the segments of the stripe. Typically, the two or more segments of each stripe include at least respective first and second segments, and the one or more switches include a switch in each of the stripes interconnecting the respective first and second segments, and the device includes a single control line connected to actuate the switch in each of the stripes so as to electrically join or separate the first and second segments in all of the stripes simultaneously.

Additionally or alternatively, the two or more segments of each stripe include three or more segments connected in series by multiple switches, and the device includes multiple control lines connected to actuate the multiple switches across all of the stripes. In one embodiment, the control circuitry is connected to at least one respective end of each of the conductive stripes and is configured to apply different, respective control voltage waveforms to different segments of at least some of the excitation electrodes by, in alternation, actuating the multiple switches and modifying the control voltage waveforms applied to respective ends of the conductive stripes.

There is also provided, in accordance with an embodiment of the invention, optical apparatus, which includes an electrically-tunable lens. The lens includes an electro-optical layer, having, for a given polarization of light incident on the layer, an effective local index of refraction at any given location within an active area of the electro-optical layer that is determined by a voltage waveform applied across the electro-optical layer at the location. Conductive electrodes extend over opposing first and second sides of the electro-optical layer, the electrodes including an array of excitation electrodes extending across the first side of the electro-optical layer. Control circuitry is coupled to apply respective control voltage waveforms to the excitation electrodes so as to generate a specified phase modulation profile in the electro-optical layer. A polarization rotator is positioned and configured to intercept incoming light that is directed toward the lens and to rotate a polarization of the intercepted light so as to ensure that the light incident on the electro-optical layer has a component of the given polarization regardless of an initial linear polarization of the intercepted light.

In disclosed embodiments, the polarization rotator includes a quarter-wave plate or a birefringent plate.

In some embodiments, the device includes a polarizer, which is interposed between the polarization rotator and the electrically-tunable lens and is oriented so as to pass the component of the given polarization.

There is additionally provided, in accordance with an embodiment of the invention, adaptive spectacles, which include a spectacle frame and first and second electrically-tunable lenses, mounted in the spectacle frame. Control circuitry is configured to receive an input indicative of a distance from an eye of a person wearing the spectacles to an object viewed by the person, and to tune the first and second lenses to have different, respective first and second focal powers that bracket the distance indicated by the input.

In some embodiments, the first and second lenses are mounted in the spectacle frame so as to apply the first and second focal powers respectively to the light that is incident on the left and right eyes of the person.

Additionally or alternatively, the first lens is configured to apply the first focal power only to light of a first polarization, while the second lens is configured to apply the second focal power only to light of a second polarization, orthogonal to the first polarization. In some embodiments, the first and second lenses are mounted in the spectacle frame so as to apply the first and second focal powers to the light that is incident on a single eye of the person. In a disclosed embodiment, the spectacles include a polarization rotator, positioned and configured to intercept incoming light that is directed toward the first and second lenses and to rotate a polarization of the intercepted light so as to ensure that the light incident on the first and second lenses has respective components of both of the first and second polarizations regardless of an initial polarization of the incoming light.

In some embodiments, the spectacles include a sensor, configured to sense the distance from the eye of a person wearing the spectacles to the object viewed by the person and coupled to provide the input indicative of the distance to the control circuitry. Typically, the sensor is selected from a group of sensors consisting of an eye tracker, a camera configured to capture an image of the object, a rangefinder, a proximity sensor, and a trigger sensor operable by the person wearing the spectacles.

Additionally or alternatively, the sensor is configured to sense a gaze direction of the eye toward the object, and wherein the control circuitry is configured to shift respective optical axes of the first and second lenses responsively to the sensed gaze direction. The control circuitry may be configured to shift the optical axes in response to a change in the sensed gaze direction with a predefined time lag relative to the change.

There is further provided, in accordance with an embodiment of the invention, a method for producing an optical device. The method includes providing an electro-optical layer, having an effective local index of refraction at any given location within an active area of the electro-optical layer that is determined by a voltage waveform applied across the electro-optical layer at the location. Conductive electrodes are positioned so as to extend over opposing first and second sides of the electro-optical layer. The electrodes include an array of excitation electrodes, which include parallel conductive stripes extending along respective, mutually-parallel axes across the first side of the electro-optical layer. Each stripe is divided into two or more segments extending over respective, mutually disjoint parts of an axis of the stripe. Control circuitry is coupled to apply respective control voltage waveforms to the segments of the excitation electrodes so as to generate a specified phase modulation profile in the electro-optical layer and to concurrently modify the respective control voltage waveforms applied to one or more of the segments of each of a plurality of the excitation electrodes, thereby modifying a phase modulation profile of the electro-optical layer.

There is moreover provided, in accordance with an embodiment of the invention, a method for producing optical apparatus. The method includes providing an electrically-tunable lens, which includes an electro-optical layer, having, for a given polarization of light incident on the layer, an effective local index of refraction at any given location within an active area of the electro-optical layer that is determined by a voltage waveform applied across the electro-optical layer at the location. Conductive electrodes extends over opposing first and second sides of the electro-optical layer. The electrodes include an array of excitation electrodes extending across the first side of the electro-optical layer. Control circuitry is coupled to apply respective control voltage waveforms to the excitation electrodes so as to generate a specified phase modulation profile in the electro-optical layer. A polarization rotator is positioned to intercept incoming light that is directed toward the lens and to rotate a polarization of the intercepted light so as to ensure that the light incident on the electro-optical layer has a component of the given polarization regardless of an initial linear polarization of the intercepted light.

There is furthermore provided, in accordance with an embodiment of the invention, a method for operating adaptive spectacles. The method includes mounting first and second electrically-tunable lenses in a spectacle frame. An input is received, indicative of a distance from an eye of a person wearing the spectacles to an object viewed by the person. The first and second lenses are tuned to have different, respective first and second focal powers that bracket the distance indicated by the input.

There is also provided, in accordance with an embodiment of the invention, adaptive spectacles, which include a spectacle frame and first and second electrically-tunable lenses, mounted in the spectacle frame. A sensor is configured to output a signal indicative of a gesture performed by an eye of a person wearing the spectacles. Control circuitry is configured to tune an optical characteristic of at least one of the first and second lenses in response to the signal.

Typically, the gesture performed by the eye is selected from a group of gestures consisting of eye movements, blinks and winks.

There is additionally provided, in accordance with an embodiment of the invention, a method for operating adaptive spectacles. The method includes mounting first and second electrically-tunable lenses in a spectacle frame. A signal is received, indicative of a gesture performed by an eye of a person wearing the spectacles. An optical characteristic of at least one of the first and second lenses is tuned in response to the signal.

The present invention will be more fully understood from the following detailed description of the embodiments thereof, taken together with the drawings in which:

DETAILED DESCRIPTION OF EMBODIMENTS

Overview

Bifocal and multifocal lenses contain zones of different optical powers, in order to enable the person using the lens to see objects at different distances. This sort of multifocal capability enhances the ability of the lenses to correct the vision of people with limited capability for distance accommodation (such as older people who suffer from presbyopia). The zone structure of the lenses, however, limits the field of view at any given distance to the area of the zone of the lens that provides the required optical power for that distance.

Electrically-tunable spectacle lenses can provide a more flexible and comfortable solution in such cases. The lenses may be coupled with sensors of various types in order to adjust the focal lengths and optical axes of the lenses according to the object being viewed by the person wearing the spectacles. Ideally, this sort of adjustment would provide optimal correction of vision over the entire area of the lens, regardless of the focal distance of viewing angle. In practice, however, sensors provide an imperfect indication as to the desired focal distance and angle of the eye at any given moment, and dynamic adjustment of the lens properties can therefore be uncertain. Furthermore, people with severe limitations on their ability to accommodate for distance may benefit from the use of a multifocal lens even when the focal length (or lengths) of the lens is electronically tuned.

Embodiments of the present invention that are described herein provide novel electrically-tunable lenses with properties that can be used, inter alia, to address the practical difficulties involved in dynamic correction of human vision. Some of these embodiments are useful in particular in providing multifocal performance in such a lens.

The disclosed embodiments are based on optical devices that comprise an electro-optical layer, such as a liquid crystal layer, having an effective local index of refraction at any given location within the active area of the layer that is determined by a voltage waveform applied across the layer at that location. Conductive electrodes extend over both sides of the electro-optical layer, including, on at least one of the sides, an array of excitation electrodes, which comprise parallel conductive stripes extending along respective, mutually-parallel axes across the electro-optical layer. The electrodes on the opposing side of the electro-optical layer may comprise either a common electrode (in which case the device functions as a cylindrical lens) or an array of parallel stripes oriented orthogonally to the stripes on the other side (so that the device functions in a manner that emulates a spherical or aspheric lens). Devices of this general type and details of their operation are described further in the above-mentioned PCT International Publication WO 2014/049577. The principles of the disclosed embodiments, however, may alternatively be applied, mutatis mutandis, to other sorts of adaptive lens designs.

In some embodiments, each stripe of the excitation electrodes on at least one side of the electro-optical layer is divided into two or more segments, which extend over respective, mutually disjoint parts of the axis of the stripe. Control circuitry applies respective control voltage waveforms to the segments of the excitation electrodes so as to generate a specified phase modulation profile in the electro-optical layer. Specifically, the control circuitry can apply different control voltage waveforms to the different segments of at least some of the excitation electrodes, so that the lens functions as a multifocal lens, with different zones having different optical powers. The control circuitry can modify the control voltage waveforms applied to the electrode segments in order to modify the phase modulation profile of one or more of the different zones.

In some embodiments, the segmented stripes include one or more switches interconnecting the segments of the stripe. These switches are operable by the control circuitry to electrically join or separate the segments of the stripe. The control circuitry is thus able to dynamically change not only the focal properties of the different zones of the lens, but also their sizes and locations, by appropriately closing or opening the switches.

Although some electro-optical materials, such as cholesteric liquid crystals, operate on light regardless of polarization, most commonly-available liquid crystals and other electro-optical materials are sensitive to polarization and may exert their refractive effect only on incident light of a certain polarization. This limitation of the electro-optical material can limit the performance of adaptive spectacle lenses based on the material. Some of the embodiments of the present invention that are described herein overcome this limitation by innovative use of polarization-rotating elements, and even turn the limitation to advantage in enhancing performance of the spectacles.

In some of these embodiments, a polarization rotator intercepts incoming light that is directed toward an electrically-tunable lens and rotates the polarization of the intercepted light so as to ensure that the light incident on the electro-optical layer has a component of polarization that will be refracted by the lens even if the intercepted light is linearly polarized in a direction orthogonal to the polarization refracted by the electro-optical material. The polarization rotator typically comprises a quarter-wave plate or a birefringent plate, for example. In one embodiment, a polarizer is interposed between the polarization rotator and the electrically-tunable lens and is oriented so as to pass only the component of the light with the polarization that will be refracted by the lens. In an alternative embodiment, two electrically-tunable lenses, with electro-optical layers that are oriented to refract light with mutually-orthogonal polarizations, may be arranged in series so that incoming light of any polarization will be focused.

Some embodiments that are described herein provide adaptive spectacles comprising electrically-tunable lenses, which are mounted in a spectacle frame along with a sensor, which senses the distance from the eye of a person wearing the spectacles to an object viewed by the person. Control circuitry tunes the lenses according to the sensed distance, but it is not always possible or desirable to determine the distance unequivocally. Therefore, in some embodiments, the control circuitry tunes the lenses in the frame to have different, respective focal powers (also referred to as optical powers) that bracket the sensed distance. The term "bracket" is used in this context, in the present description and in the claims, in the sense of focus bracketing, to mean that the focal powers range around a certain target power value that is chosen on the basis of the sensed distance. (The bracketing need not be symmetrical, and one of the focal powers can actually be the target power itself.) Such bracketing may be applied by the adaptive spectacles not only when the object distance is sensed automatically, but also to enhance the depth of field when the user sets the focal distance manually.

Some of these embodiments make use of a pair of electrically-tunable lenses, as described above, with respective electro-optical layers oriented so that the first lens applies its focal power only to light of a certain polarization, while the second lens applies its focal power, which is different from that of the first lens, only to light of the orthogonal polarization. In one embodiment, these two lenses are arranged to apply their focal powers to the light that is incident respectively on the left and right eyes of the person wearing the spectacles. In another embodiment, the two lenses are mounted one behind the other in the spectacle frame so as to apply the respective focal powers to the light that is incident on a single eye of the person. In either case, the person's eye or eyes will receive two images at different focal lengths. Alternatively, both the right and left electrically-tunable lenses may apply their respective focal powers irrespective of polarization; for this purpose, the lenses may comprise an electro-optical material that is insensitive to polarization, or they may comprise two polarization-sensitive lenses and/or lenses and polarization rotators, as described above. In any of these cases, the brain is capable of choosing and processing the image that is actually in focus on the object of interest.

System Description

Figure 1:
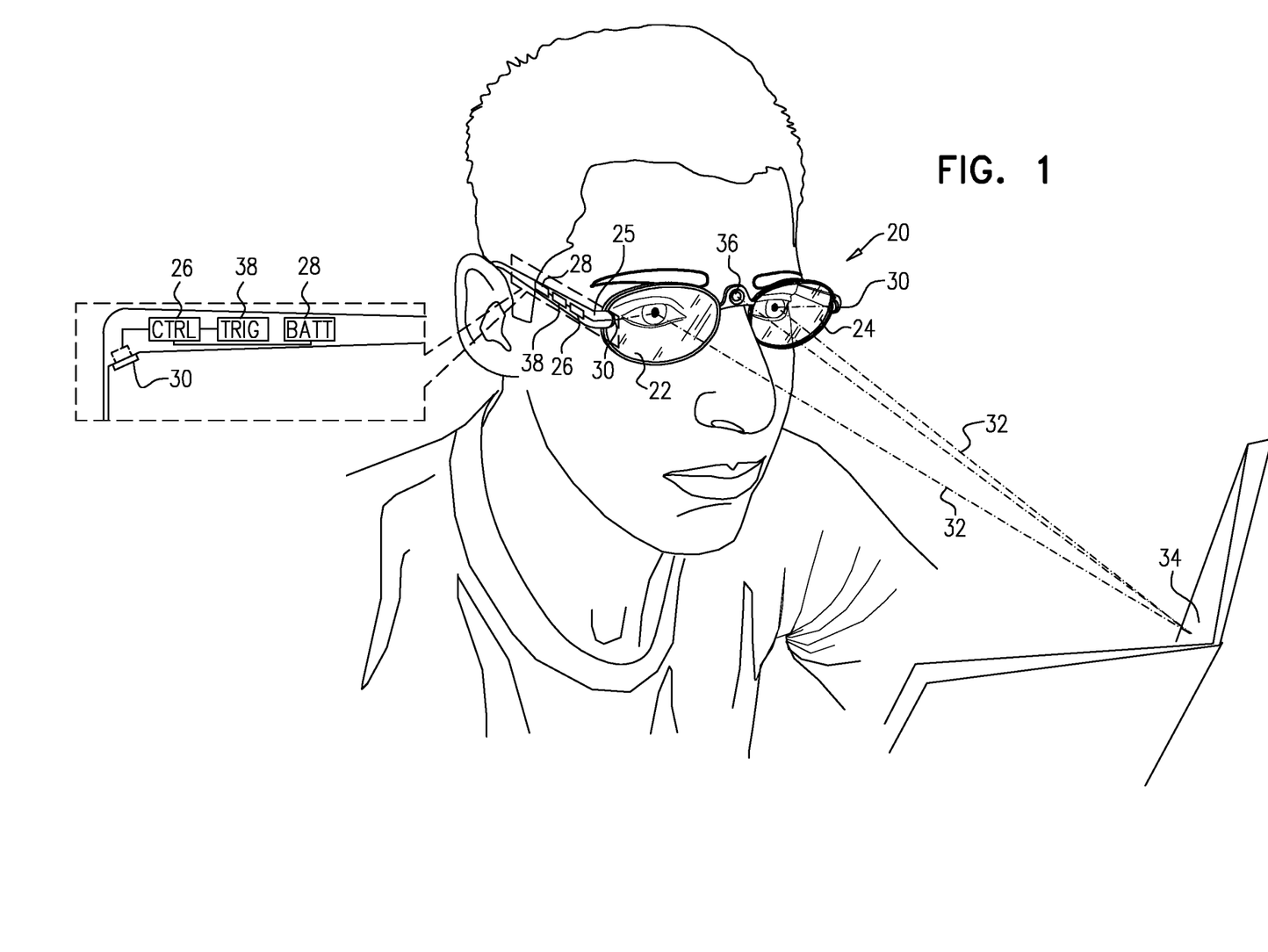
FIG. 1 is a schematic, pictorial illustration of adaptive spectacles, in accordance with an embodiment of the invention.

FIG. 1 is a schematic, pictorial illustration of adaptive spectacles 20, in accordance with an embodiment of the invention. Spectacles 20 comprise electrically-tunable lenses 22 and 24, mounted in a frame 25. The optical properties of the lenses, including focal length and optical center (or equivalently, the optical axis) are controlled by control circuitry 26, powered by a battery 28 or other power source. Control circuitry 26 typically comprises an embedded microprocessor with hard-wired and/or programmable logic components and suitable interfaces for carrying out the functions that are described herein. These and other elements of spectacles 20 are typically mounted on or in frame 25, or may alternatively be contained in a separate unit (not shown) connected by wire to frame 25.

Spectacles 20 comprise one or more sensors, which sense the distance from the eye of the person wearing the spectacles to an object 34 viewed by the person. Control circuitry 26 tunes lenses 22 and 24 according to the sensor readings. In the pictured example, the sensors include a pair of eye trackers 30, which detect respective gaze directions 32 of the right and left eyes. Control circuitry 26 typically shifts the respective optical axes of lenses responsively to the sensed gaze directions. Furthermore, the control circuitry can use the distance between the pupils, as measured by eye trackers 30, to estimate the user's focal distance (even without analyzing the actual gaze direction), and possibly to identify object 34.

A camera 36 captures an image of object 34, for use by control circuitry 26 in identifying the object and setting the focal distance. Either eye trackers 30 or camera 36 may be used in determining the focal distance, but both of these sensors can be used together to give a more reliable identification of the object. Alternatively or additionally, camera 36 may be replaced or supplemented by a rangefinder or other proximity sensor, which measures the distance to object 34.

In some embodiments, spectacles 20 also include at least one trigger sensor 38, which activates the other components of spectacles 20. For example, trigger sensor 38 may comprise a timer that triggers control circuitry 26 and other elements periodically, or other sensors indicating a possible change of the viewing distance, such as a head movement sensor, or a user input sensor. In one mode of operation, when trigger sensor 38 is actuated, camera 36 or other proximity sensors detect the distance to objects in the user's field of view. If all objects in the field of view are at approximately the same distance, lenses 22 and 24 can be configured to focus the user's vision to that distance. If several objects are detected at different distances in the user's field of view, eye trackers 30 are activated to determine the distance at which the user is looking, for example by analyzing the distance between the user's pupils.

Additionally or alternatively, control circuitry 26 may actuate the functions of spectacles 20 in response to user inputs. Various input devices (not shown in the figures) may be used for this purpose, for example:

- Buttons (push-buttons or touch buttons) on frame 25.
- Eye-based gesture control systems, based on eye trackers 30 or other sensors, which change the lens properties depending on eye movements, winks and/or blinks.
- Buttons placed on an external device, such as a wrist band, which is connected to control circuitry 26 through a wired or wireless communications link, such as a Bluetooth link.
- Motion detectors on an external device such as a wrist band, connected to the control circuitry 26 through a wired or wireless communications link, which cause the control circuitry to modify the lens properties according to specific movements, such as wrist rotations or movements in specific directions.
- Applications implemented on portable or wearable devices that are connected to control circuitry 26 through a wired or wireless communications link.
- Voice control, in which control circuitry 26 modifies the lens properties based on speech analysis or sound analysis to identify predefined voice commands.

Further additionally or alternatively, control circuitry 26 may have predefined operating modes, which are determined by user inputs and/or sensor inputs and can help in optimizing the focal distances of lenses 22 and 24 under some conditions. Such operating modes may include, for example:

- Manual—The user manually selects a single distance (reading, intermediate or far). Lenses 22 and 24 are adjusted accordingly, and the automatic focusing system is disabled.
- Office—Favors intermediate and close-range adjustment of lenses 22 and 24.
- Standby—If no movement is detected for some time, shut down sensors 30, 36 and lenses 22, 24 to save energy.
- Driving—Favors far vision. For safety reasons, it is possible to keep at least a portion of lenses 22 and 24 constantly at a far vision setting and ignore shakes.
- Reading—Favors close range, with switch to other ranges only in special cases.
- Normal—No context data. In this case, control circuitry relies only on sensors 30, 36.

Precise detection of viewing distance by sensors 30 and 36 can be difficult and uncertain, and erroneous setting of the focal powers of lenses 22 and 24 can be disturbing to the user. To alleviate this problem, lenses 22 and 24 may be set to different, respective focal powers that bracket a certain target distance that is estimated based on the sensors. This target distance is typically the estimated distance to the object being viewed, such as object 34. The lens power disparity takes advantage of the fact that binocular vision often requires only one eye to see a sharply-focused image in order for the view to seem focused.

For example, if detectors 30 and 36 indicate that the target distance is 1 meter, for which lenses 22 and 24 should be set to 1 diopter (relative to the user's normal refractive corrections), and the user has a tolerance for defocus of 0.2 diopters, then control circuitry 26 may set lenses 22 and 24 to respective powers of 0.8 and 1.2 diopters. This focal bracketing gives the user the ability to see in focus over a wider range of distances (corresponding to powers of 0.6 to 1.4 diopters), in case the detected distance was not accurate.

Lenses 22 and 24 can be operated with different optical powers at all times or only under certain circumstances in which the object distance is uncertain. The difference between the focal powers of the left and right lenses (0.4 diopters in the example above) can be constant or vary a function of several parameters, such as the level of confidence in the object distance detected by sensors 30, 36; the probability distribution of the outputs of sensors 30, 36; lighting conditions; the detected distance itself; and the user's preferences.

In another embodiment, lens 22 (and/or lens 24) may comprise two or more optical elements that apply different, respective focal powers to the incoming light that is incident on one or both of the user's eyes. These optical elements may be configured to refract light of different polarizations, for example by orienting the electro-optical layers in the elements in orthogonal directions. This embodiment is described further hereinbelow with reference to FIG. 2. Lenses 22 and 24 may be configured to operate on orthogonal polarizations in a similar manner.

As noted earlier, in some embodiments, control circuitry 26 uses the gaze directions indicated by eye trackers 30 in order to shift the optical axes (i.e., to position the optical centers) of lenses 22 and 24 dynamically to match the pupil locations, in addition to or instead of adjusting the focal power. By shifting the optical axis with the pupil, the lens quality can be improved, particularly when the user is looking through an area near the edge of the lens.

Erroneous shifts of the optical axis, however, can result in poor user experience. In one embodiment, control circuitry 26 overcomes this problem by applying a predefined time lag when shifting the optical axes in response to changes in the sensed gaze direction. The optical center of the lens thus moves gradually in response to eye movements, until it reaches the optimal position. Gradual movements of the lens center that are slow enough not be noticeable by the user may produce a more natural experience for the user compared to abrupt lens shifts. The optical centers of lenses 22 and 24 can be moved either simultaneously or consecutively, whether gradually or instantaneously in response to eye movements.

Detailed Features of Electrically-Tunable Lenses

Figure 2:
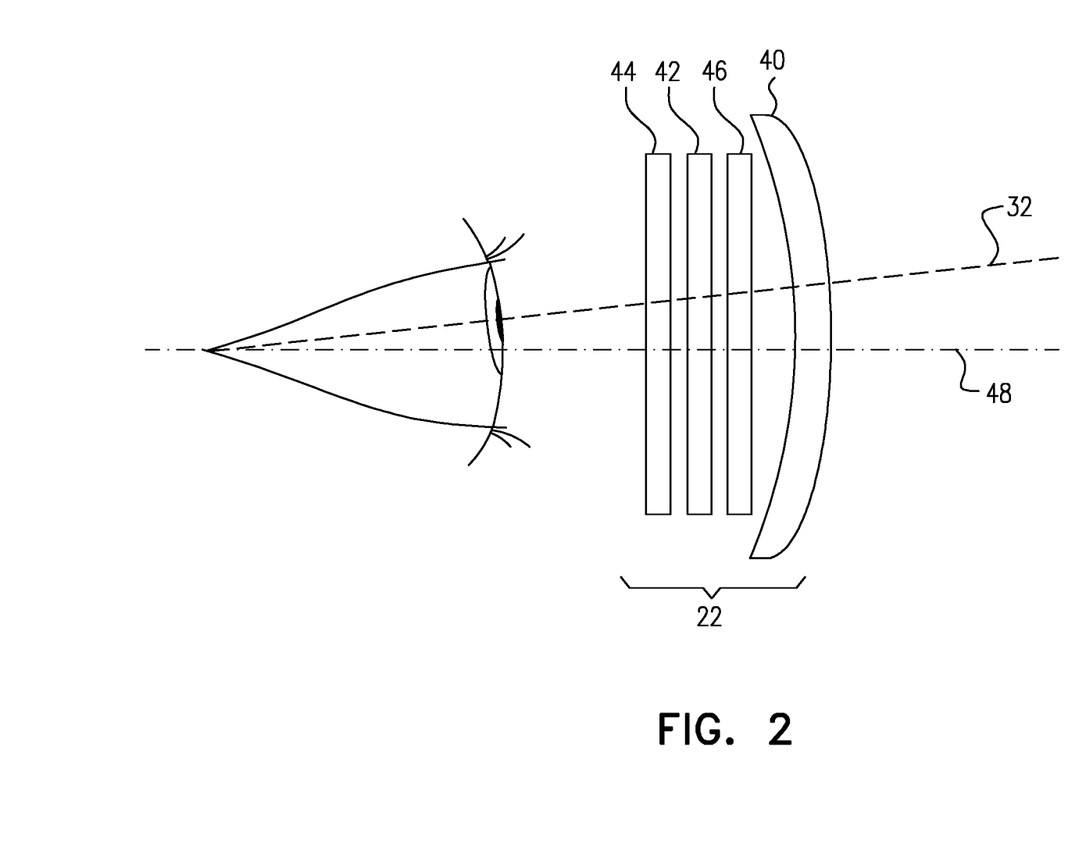
FIG. 2 is a schematic side view of an electronically-tunable lens system, in accordance with an embodiment of the invention.

FIG. 2 is a schematic side view of electronically-tunable lens 22, in accordance with an embodiment of the invention. Lens 24 is typically of similar design.

In the pictured embodiment, lens 22 is a compound lens, which comprises multiple elements: A fixed lens 40, typically made from glass or plastic, provides a baseline optical power, which is modified dynamically by two electrically-tunable lenses 42 and 44. (For this reason, lens 22 itself can be considered an electrically-tunable lens.) Alternatively, lens 22 may comprise only a single electrically-tunable element, and fixed lens 40 may not be needed in some applications. In some embodiments, lens 22 also comprises a polarizing element 46, such as a polarizer and/or polarization rotator, with functionality as described hereinbelow.

Electrically-tunable lenses 42 and 44 adjust the optical power of lens 22 depending on the focal distance to the object being viewed by the user, while taking into account the considerations described in the preceding section. Additionally or alternatively, an optical axis 48 of lenses 42 and 44 may be shifted in response to changes in gaze direction 32, as was likewise described above. Lenses 42 and 44 may comprise electrically-tunable cylindrical lenses, with orthogonal cylinder axes. Alternatively, lenses 42 and 44 may be configured, as shown in FIGS. 3A-3D, to generate two-dimensional phase modulation profiles and thus emulate spherical or aspheric lenses (or their Fresnel equivalents). Both of these sorts of lens configurations, as well as waveforms for driving the lenses, are described in detail in the above-mentioned WO 2014/049577.

As noted earlier, in some embodiments in which lenses 42 and 44 comprise respective polarization-dependent electro-optical layers, the two lenses are oriented so as to refract mutually-orthogonal polarizations: One of these lenses, for example, lens 42, operates on light polarized in the X-direction (pointing into the page in the view shown in FIG. 2), and does not influence light polarized in the Y-direction (pointing upward in this view). Lens 44 operates on light polarized in the Y-direction, possibly with a different focal length from lens 42, and does not influence light polarized in the X-direction. Unpolarized light passing through lenses 42 and 44 will thus be focused at both distances, with roughly half the light focused according to the focal length of lens 42, while the other half is focused according to the focal length of lens 44.

This solution may not work for objects that emit polarized light, such as light emitted from electronic displays. In this case, if the light is polarized in the same direction as one of lenses 42 and 44, then all of the light will be focused according to the focal length of that lens.

To avoid this sort of polarization-dependence, in some embodiments polarizing element 46 comprises a polarization rotator, which intercepts the incoming light and rotates its polarization so as to ensure that the light incident on the electro-optical layers of lenses 42 and 44 has a component at each of the respective polarizations, regardless of the initial polarization of the intercepted light. For example, in one embodiment, polarizing element 46 comprises a quarter-wave plate, typically with a wide optical bandwidth. The axes of the quarter-wave plate are oriented at a 45° angle with respect to the polarization axes of lenses 42 and 44. The polarization of any linearly-polarized light passing through the quarter-wave plate will then be rotated so that the energy is divided equally between the orthogonal polarization directions of the lenses and will be focused at the focal lengths of both of lenses 42 and 44 just as in the case of unpolarized light. Lenses 22 and 24 in spectacles 20 (FIG. 1) may contain respective quarter-wave plates that rotate the polarization either in the same direction or in opposite directions.

In an alternative embodiment, polarizing element 46 comprises a transparent birefringent plate, creating a wavelength-dependent polarization rotator. A layer with birefringence $\Delta n(\lambda)$, as a function of the wavelength $\lambda$, and thickness d creates a wavelength-dependent polarization rotator, with relative phase retardation between the axes given by $$\Delta \varphi(\lambda) = \frac{2\pi}{\lambda} d \Delta n(\lambda).$$

The birefringent plate in lens 22 is oriented so as to rotate the polarization of light that enters the plate with polarization along either the X- or Y-axis (assuming that these are the polarization axes of lenses 42 and 44). The amount of rotation depends on the wavelength $\lambda$ and the thickness d. As long as the birefringent plate is sufficiently thick, the intensity of the light exiting the plate, when averaged over any but a very narrow range of wavelengths, will be divided equally between the X- and Y-polarizations. This arrangement ensures that half of the light will be focused by lens 42 and the other half by lens 44.

In some embodiments, polarizing element 46 also comprises a polarizer, which is interposed between the polarization rotator and lens 42 and is oriented so as to pass the polarization component that is focused by lens 42. (In this case, lens 44 may be omitted, or else lenses 42 and 44 may be cylindrical lenses, with the same axis of polarization.) Lens 22 will then operate on light of any polarization, regardless of its orientation. As in the preceding embodiments, the polarization rotator (such as a quarter-wave plate or birefringent plate) is oriented with its axis at a 45° angle relative to the polarization axis of lens 42. The polarizer is oriented so that its polarization axis is parallel to that of lens 42. This arrangement ensures that for any linearly-polarized light (and unpolarized light as well), half of the intensity will be passed through to lens 42, polarized parallel to the polarization axis of the lens, so that lens 42 will focus the light as desired.

Figure 3A:
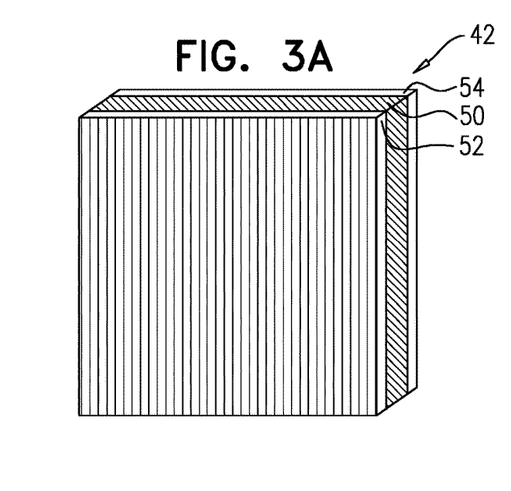
FIG. 3A is a schematic, pictorial illustration of an electronically-tunable lens, in accordance with another embodiment of the present invention.
Figure 3B:
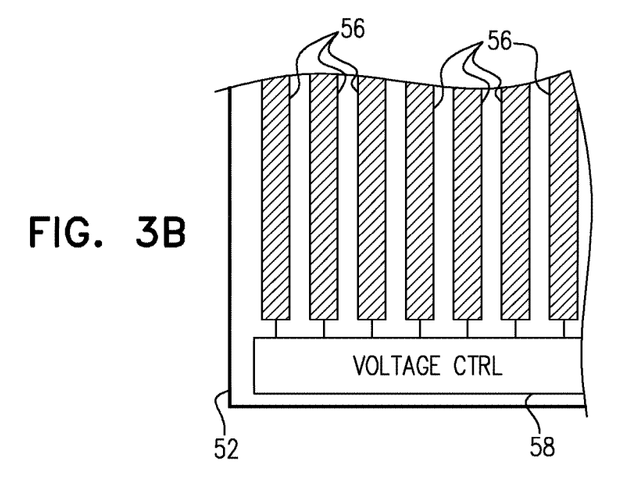
FIGS. 3B and 3C are schematic frontal views of electrodes formed on opposing sides of the lens of FIG. 3A, in accordance with an embodiment of the present invention.
Figure 3C:
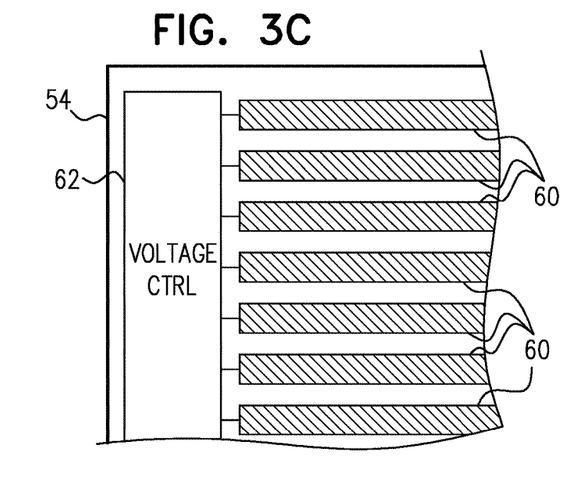
Figure 3D:
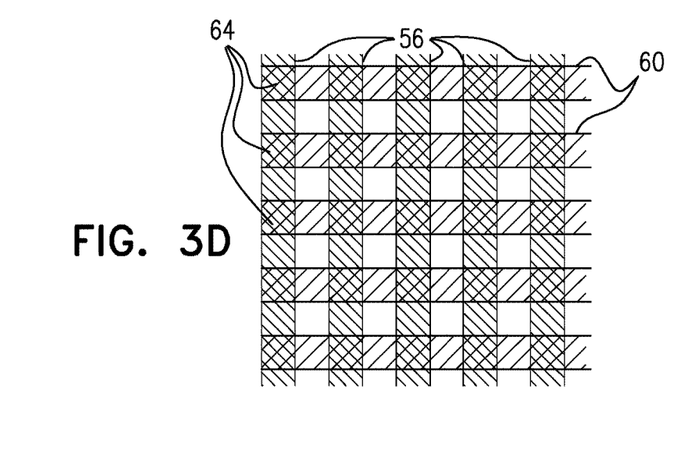
FIG. 3D is a schematic frontal of the lens of FIG. 3A, showing a superposition of the electrodes on the opposing sides of the lens, in accordance with an embodiment of the present invention.

FIGS. 3A-3D schematically show details of electronically-tunable lens 42 in accordance with an embodiment of the present invention. FIG. 3A is a pictorial illustration of lens 42, while FIGS. 3B and 3C are side views showing transparent substrates 52 and 54 on opposing sides of an electro-optical layer 50 in lens 42. FIG. 3D is a side view of device 42, showing a superposition of excitation electrodes 56 and 60 that are located on substrates 52 and 54 on the opposing sides of lens 42. Lens 44 may be of similar design.

Electro-optical layer 50 typically comprises a liquid-crystal layer, as described in the above-mentioned PCT International Publication WO 2014/049577. As explained above, layer 50 typically refracts light, in response to the voltage waveforms applied by electrodes 56 and 60, in only one direction of polarization, while the other polarization passes through lens 42 without refraction. Alternatively, layer 50 may comprise a cholesteric liquid crystal or other electro-optical material that is polarization-independent.

Electrodes 56 and 60 on substrates 52 and 54, respectively, comprise parallel stripes of transparent conductive material extending over the active area of layer 50 in mutually-orthogonal directions. Although electrodes 56 and 60 are of uniform shape and spacing in the figures, the stripes may alternatively have varying sizes and/or pitch. As shown in FIG. 3D, the superposition of electrodes 56 and 60 creates an array of pixels 64, defined by the areas of overlap of the vertical stripes of electrodes 56 with the horizontal stripes of electrodes 60.

Control circuits 58 and 62, under the control of control circuitry 26 or another controller, apply control voltages to excitation electrodes 56 and 60, respectively. As described in the above-mentioned WO 2014/049577, the control circuits in lens 42 are able to modify the control voltages applied to each of a set of the excitation electrodes (which may include all of the electrodes) simultaneously and independently. Control circuits 58 and 62 together can modify the voltages applied to sets of the excitation electrodes on both of the sides of layer 50, thereby modifying the phase modulation profile of the layer in two dimensions.

The control voltages applied to excitation electrodes 56 and 60 tune the focal properties of lens 42, as determined by the phase modulation profile. Control circuits 58 and 62 can modify the control voltages so as to change the focal length and/or to shift the optical axis of the lens. The voltage patterns applied by circuits 58 and 62 across electrodes 56 and 60 may be chosen so as to give a phase modulation profile that is circularly symmetrical, and may thus emulate a spherical or aspheric lens. Alternatively, different voltage patterns may be applied so that lens 42 functions, for example, as an astigmatic lens, with a stronger cylindrical component along one axis or the other.

Partitioned Dynamic Lenses

In some cases it may be desirable to partition the area of an electronically-tunable lens, such as lenses 22 and 24, into two independent lenses. For example, spectacles 20 may be configured so that in some scenarios, the lenses are partitioned, with part of the lenses set constantly for the user's vision correction to infinity, and the other part changing dynamically. The embodiments described below support optional spatial partitioning of the area of an electronically-tunable lens. The lens in these embodiments either can be operated as a single lens spanning over all (or at least part) of the active area, or the active area can be partitioned into two or more regions, each region implementing different lens characteristics (such as focal length and/or optical axis). The lenses can be made to switch dynamically between these modes.

Figure 4:
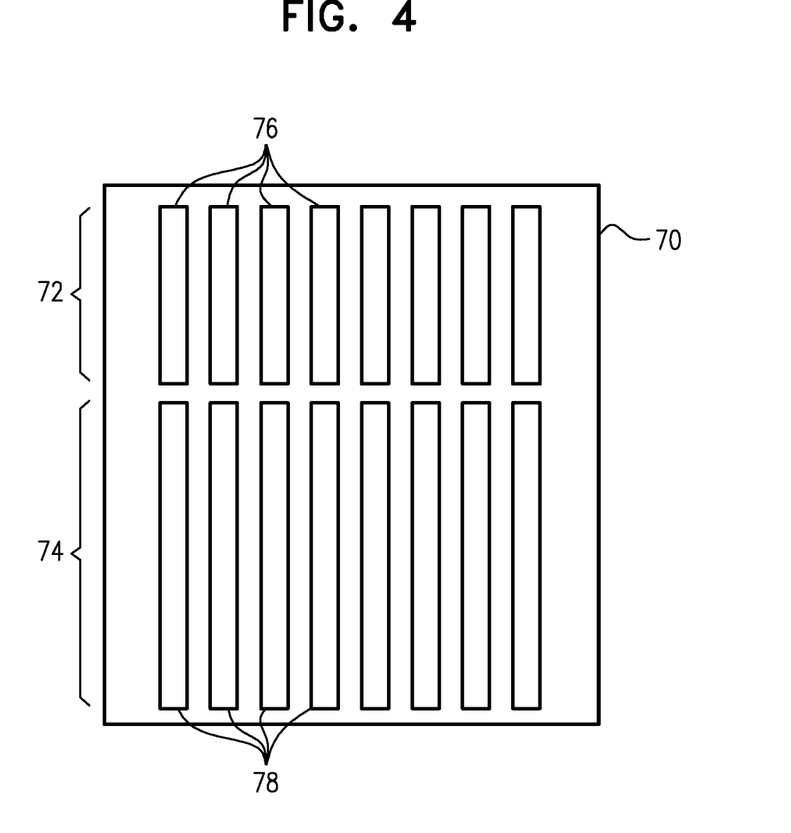
FIG. 4 is a schematic frontal view of electrodes formed on an electronically-tunable lens, in accordance with another embodiment of the invention.

FIG. 4 is a schematic frontal view of electrodes formed on a substrate 70 for use in a partitioned, electronically-tunable lens, in accordance with an embodiment of the invention. Substrate 70 and the electrodes formed thereon may be used in lens 42, for example, to apply voltage waveforms to layer 50 (FIGS. 3A-3D) in place of substrate 52 and electrodes 56. Electrodes 60 on substrate 54 may remain as shown in FIG. 3C, or they may alternatively be partitioned in a manner similar to that shown in FIG. 4. Further alternatively, to produce a partitioned cylindrical lens, electrodes 60 may be replaced on substrate 54 by a single, common electrode (not shown in the figures).

The electrodes on substrate 70 comprise an array of parallel conductive stripes extending along respective, mutually-parallel axes across the active area of the electro-optical layer. Each stripe is divided into two segments 76 and 78, extending over respective, mutually disjoint parts of the axis of the stripe. (In alternative schemes, such as the dynamic scheme illustrated in FIG. 5, each stripe may be divided into three or more segments.) Typically, although not necessarily, segments 76 are connected to and controlled from conductors at the upper edge of substrate 70 in the view shown in FIG. 4, while segments 78 are connected to and controlled from conductors at the lower edge.

Segments 76 together extend across and cover an area 72 of the lens, while segments 78 extend across and cover a different area 74. Control circuitry 26 is able to apply different control voltage waveforms to the segments in area 72 from those applied to the corresponding segments in area 74, and thus causes the lens to function as a multifocal lens, with different focal zones corresponding to areas 72 and 74. Typically, the focal zones have different, respective focal lengths. When desired, however, the same waveforms may be applied to each segment 76 as to its counterpart segment 78 in each stripe, so that both areas 72 and 74 have the same focal characteristics.

Figure 5:
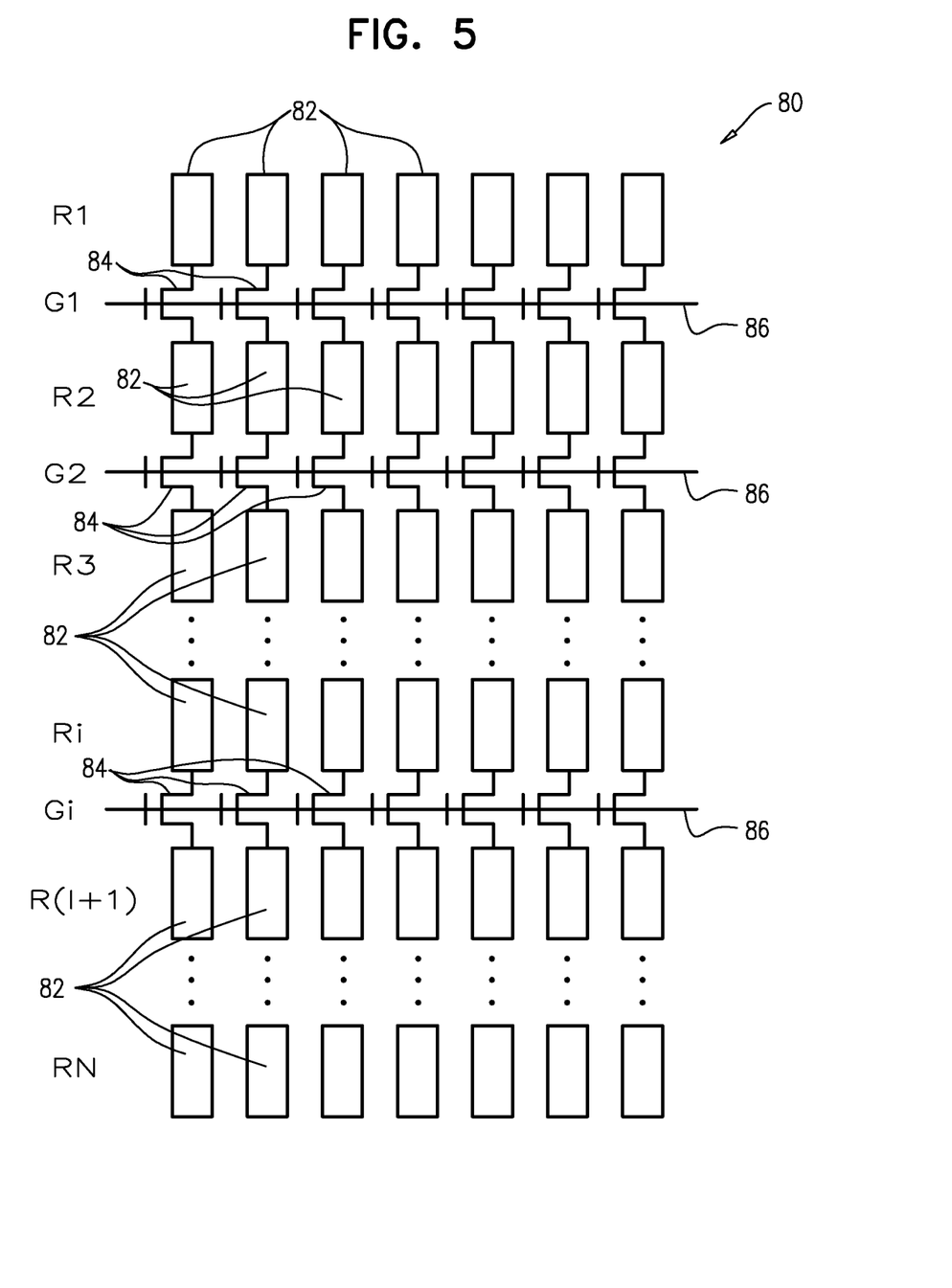
FIG. 5 is a schematic electrical diagram showing electrodes and switching elements formed on an electronically-tunable lens, in accordance with an alternative embodiment of the invention.

FIG. 5 is a schematic electrical diagram showing electrode segments 82 and switches 84 formed on a substrate 80 in an electronically-tunable lens, in accordance with an alternative embodiment of the invention. Each stripe may comprise as few as two segments 82, as in the preceding embodiment. In the embodiment shown in FIG. 5, however, each stripe is divided into n segments 82, labeled R1, R2, . . . , Rn, which are interconnected in series by switches 84, labeled G1, G2, . . . , Gn−1, such as suitable thin-film transistors. Control lines 86 are connected to actuate corresponding rows of switches 84 across all of the stripes, with a single control line connected to each switch Gi over all of the stripes. By actuating the appropriate control lines, control circuitry 26 is thus able to electrically join or separate each segment to or from its neighbors in all of the stripes simultaneously.

In order to achieve good optical quality, the gaps between segments 82 are typically much smaller than the lengths of the segments themselves. The segments can all be of similar lengths, as in the example shown in FIG. 5, or different segments can have different lengths, both within each stripe and between different stripes.

Control circuitry 26 is typically connected to apply the control voltage waveforms to one or both ends of each of the conductive stripes, for example, to segment R1 and possibly segment Rn in each stripe. To apply different, respective control voltage waveforms to different segments, the control circuitry can actuate the appropriate switches 84 and modify the control voltage waveforms applied to the respective ends of the conductive stripes.

For example, in order to partition lens 80 along the line of switches Gi, control circuitry 26 sets all of control lines 86 for k≠i to turn on (close) the corresponding switches Gk, so that the neighboring segments 82 are electrically joined together. At the same time, control line i is set to turn off (open) switches Gi, thus separating the segments Ri and Ri+1 along the partitioning line. Control circuitry 26 applies voltage waveforms to segments R1 that are chosen to implement a first set of focal characteristics. These waveforms pass through switches 84 and thus propagate down through segments 82 in each stripe until they reach the open switches Gi. In a similar fashion, control circuitry 26 applies other waveforms to segments Rn, chosen so as to implement different focal characteristics, and these waveforms pass through switches 84 and segments 82 up to the same separating line at switches Gi.

In another embodiment, lens 80 is used to implement a partitioned dynamic lens in which each of two or more zones, as defined by a row of segments or a group of such rows, can be set to implement different focal characteristics (focal length and/or optical axis), with control circuitry connected to segment R1. Zones 1, . . . , n, corresponding to segments R1, . . . , Rn, can be made to implement focal characteristics F1, . . . , Fn by applying the following steps:
1) Set all switches, Gk, k=1 . . . n−1 to 'on'.
2) Apply voltages to the electrodes to implement focal characteristics Fn.
3) Repeat for j=n−1 to 1:
   a) Set switch Gj to 'off'.
   b) Apply voltages to the electrodes to implement lens Fj.

Using this method, switches 84 are turned off (opened) one row at a time. The voltages of the electrode segments in section Rj are updated during the interval between the opening of switch j and the opening of switch j−1. It is desirable that the duration of this interval be kept to a minimum, but it should be long enough to ensure that the voltages on segments Rj reach their final values and are updated correctly.

The voltage applied to each electrode segment Rj changes over time: When segments Rj+1 . . . Rn are updated, this voltage may be different from the voltage required to implement the correct focal characteristics Fj for zone j of the lens. Since liquid crystal is affected by the time-average voltage applied to it, these voltage changes can add noise to the modulation function of zone j. This noise can be reduced by modifying the voltage applied to the electrodes when each segment Rj is updated so as to compensate for the voltages that were applied when segments Rj+1 . . . Rn were updated, such that the time-average voltage on segment Rj has the desired value.

To enhance the efficiency of this scheme, if adjacent segments 82 require similar driving voltages (and thus implement similar lenses), they can be updated simultaneously by closing switches 84 bridging between these segments.

Additionally or alternatively, control circuitry 26 can be connected both to segment R1 and to segment Rn in each stripe, and can use a propagation sequence similar to that described above simultaneously from R1 downward and from Rn upward. In this manner, the voltages of all sections of the lens can be updated in a shorter time.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Adaptive spectacles, comprising:
a spectacle frame;
first and second electrically-tunable lenses, mounted in the spectacle frame; and
control circuitry, which is configured to receive an input indicative of a distance from an eye of a person wearing the spectacles to an object viewed by the person, and to tune the first and second lenses to have different, respective first and second focal powers that bracket the distance indicated by the input.

2. The spectacles according to claim 1, wherein the first and second lenses are mounted in the spectacle frame so as to apply the first and second focal powers respectively to the light that is incident on the left and right eyes of the person.

3. The spectacles according to claim 1, wherein the first lens is configured to apply the first focal power only to light of a first polarization, while the second lens is configured to apply the second focal power only to light of a second polarization, orthogonal to the first polarization.

4. The spectacles according to claim 3, wherein the first and second lenses are mounted in the spectacle frame so as to apply the first and second focal powers to the light that is incident on a single eye of the person.

5. The spectacles according to claim 4, and comprising a polarization rotator, positioned and configured to intercept incoming light that is directed toward the first and second lenses and to rotate a polarization of the intercepted light so as to ensure that the light incident on the first and second lenses has respective components of both of the first and second polarizations regardless of an initial linear polarization of the incoming light.

6. The spectacles according to claim 1, and comprising a sensor, configured to sense the distance from the eye of a person wearing the spectacles to the object viewed by the person and coupled to provide the input indicative of the distance to the control circuitry.

7. The spectacles according to claim 6, wherein the sensor is selected from a group of sensors consisting of an eye tracker, a camera configured to capture an image of the object, a rangefinder, a proximity sensor, and a trigger sensor operable by the person wearing the spectacles.

8. The spectacles according to claim 6, wherein the sensor is configured to sense a gaze direction of the eye toward the object, and wherein the control circuitry is configured to shift respective optical axes of the first and second lenses responsively to the sensed gaze direction.

9. The spectacles according to claim 6, wherein the control circuitry is configured to shift the optical axes in response to a change in the sensed gaze direction with a predefined time lag relative to the change.

10. A method for operating adaptive spectacles, the method comprising:
mounting first and second electrically-tunable lenses in a spectacle frame;
receiving an input indicative of a distance from an eye of a person wearing the spectacles to an object viewed by the person; and
tuning the first and second lenses to have different, respective first and second focal powers that bracket the distance indicated by the input.

11. The method according to claim 10, wherein the first and second lenses are mounted in the spectacle frame so as to apply the first and second focal powers respectively to the light that is incident on the left and right eyes of the person.

12. The method according to claim 10, wherein the first lens is configured to apply the first focal power only to light of a first polarization, while the second lens is configured to apply the second focal power only to light of a second polarization, orthogonal to the first polarization.

13. The method according to claim 12, wherein the first and second lenses are mounted in the spectacle frame so as to apply the first and second focal powers to the light that is incident on a single eye of the person.

14. The method according to claim 13, and comprising positioning a polarization rotator to intercept incoming light that is directed toward the first and second lenses and to rotate a polarization of the intercepted light so as to ensure that the light incident on the first and second lenses has respective components of both of the first and second polarizations regardless of an initial polarization of the incoming light.

15. The method according to any of claim 10, wherein receiving the input comprises sensing the distance from an eye of a person wearing the spectacles to an object viewed by the person.

16. The method according to claim 15, wherein sensing the distance comprises receiving an output of a sensor that is selected from a group of sensors consisting of an eye tracker, a camera configured to capture an image of the object, a rangefinder, a proximity sensor, and a trigger sensor operable by the person wearing the spectacles.

17. The method according to claim 10, wherein receiving the input comprises sensing a gaze direction of the eye toward the object, and wherein tuning the first and second lenses comprises shifting respective optical axes of the first and second lenses responsively to the sensed gaze direction.

18. The method according to claim 17, wherein shifting the respective optical axes comprises shifting the optical axes in response to a change in the sensed gaze direction with a predefined time lag relative to the change.

* * * * *